United States Patent
Post (10) Patent No.: US 9,777,769 B2
(45) Date of Patent: Oct. 3, 2017

(54) PASSIVE MAGNETIC BEARING SYSTEMS STABILIZER/BEARING UTILIZING TIME-AVERAGING OF A PERIODIC MAGNETIC FIELD

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 479 days.

(21) Appl. No.: 14/530,580

(22) Filed: Oct. 31, 2014

(65) Prior Publication Data

US 2016/0123387 A1  May 5, 2016

(51) Int. Cl.
*H02K 7/09* (2006.01)
*F16C 32/04* (2006.01)

(52) U.S. Cl.
CPC ...... *F16C 32/0425* (2013.01); *F16C 32/0408* (2013.01)

(58) Field of Classification Search
CPC .................................. H02K 7/09; H02K 15/03
USPC ....................................................... 310/90.5
See application file for complete search history.

(56) References Cited

U.S. PATENT DOCUMENTS

| | | |
|---|---|---|
| 5,495,221 A | 2/1996 | Post |
| 5,847,480 A | 12/1998 | Post |
| 2002/0074881 A1* | 6/2002 | Imlach ............ F16C 27/06 310/90.5 |
| 2003/0042812 A1* | 3/2003 | Post ............ F16C 32/0412 310/90.5 |
| 2005/0140228 A1* | 6/2005 | Yeh ............ F04D 29/058 310/90.5 |
| 2008/0074010 A1* | 3/2008 | Jungmayr ............ F04D 29/058 310/67 R |
| 2011/0001379 A1* | 1/2011 | McCarthy ............ F16C 19/10 310/90.5 |
| 2011/0158382 A1* | 6/2011 | Sahin Nomaler ...... A61B 6/035 378/21 |

OTHER PUBLICATIONS

Earnshaw, "On the Nature of the Molecular Forces which Regulate the Constitution of the Luminiferous Ether," Trans. of the Cambridge Philosophical Soc., 1839, 18 pages.
Post, "MHD-Stabilization of Axisymmetric Mirror Systems Using Pulsed ECRH," Fusion Science and Technology, 2009, 22 pages.

* cited by examiner

*Primary Examiner* — Thanh Lam
(74) *Attorney, Agent, or Firm* — John P. Wooldridge (57) ABSTRACT

A high-stiffness stabilizer/bearings for passive magnetic bearing systems is provide where the key to its operation resides in the fact that when the frequency of variation of the repelling forces of the periodic magnet array is large compared to the reciprocal of the growth time of the unstable motion, the rotating system will feel only the time-averaged value of the force. When the time-averaged value of the force is radially repelling by the choice of the geometry of the periodic magnet array, the Earnshaw-related unstable hit motion that would occur at zero rotational speed is suppressed when the system is rotating at operating speeds.

23 Claims, 11 Drawing Sheets

PASSIVE MAGNETIC BEARING SYSTEMS STABILIZER/BEARING UTILIZING TIME-AVERAGING OF A PERIODIC MAGNETIC FIELD

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC for the operation of Lawrence Livermore National Laboratory.

BACKGROUND OF THE INVENTION

The present invention relates to high-stiffness stabilizer/bearings for passive magnetic bearing systems, and more specifically, it relates to the concept of time-averaging of a periodic magnetic field the frequency of which is Large compared to fee rate of growth of an Earnshaw Theorem-related instability.

DESCRIPTION OF RELATED ART

Magnetic bearing systems must deal with the inhered instability of all such, systems as predicted by Earnshaw's Theorem[1], namely, that no configuration of permanent magnets exists that can levitate and stably support another configuration of permanent magnets in static equilibrium. So-called "active" magnetic bearing systems solve the Earnshaw problem by the use of sensors, feedback amplifiers, and electromagnets. Solutions have been developed or proposed at Lawrence Livermore National Laboratory (LLNL) employ dynamic effects associated with rotating magnet arrays interacting with stationary windings, or employ electrostatic forces to stabilize the passive magnetic bearing system.

SUMMARY OF THE INVENTION

This invention pertains to new magnetic configurations for stabilizers and levitating bearings for use In passive magnetic bearing systems. It is based on a new concept for avoiding the strictures of Earnshaw's Theorem, (concerning the impossibility of stably levitating any configuration of permanent magnets in static equilibrium by another configuration of permanent magnets. Stability can be achieved, however, In dynamic systems, e.g., those described in U.S. Pat. No. 5,495,221 (R. F. Post). The new approach described, here is based on the concept of time-averaging of a periodic field, the frequency of which is large compared to the rate of growth of an Earnshaw Theorem-related instability. The theoretical validity of this approach was demonstrated in a published paper (R. F. Post: "Magnetohydrodynamic Stabilization, of Axisymmetric: Mirror Systems using pulsed ECRH," Fusion Science and Technology, 57,335, 2010), incorporated herein by reference.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1A:
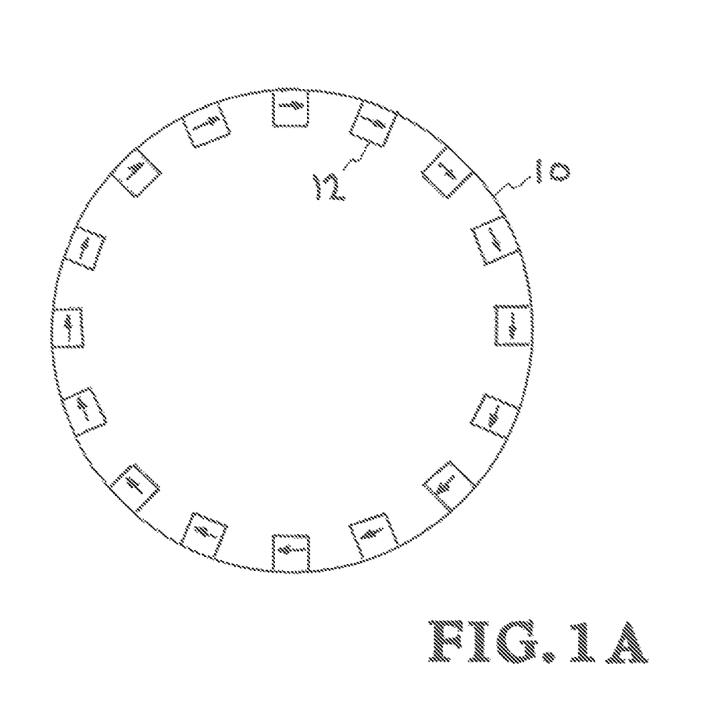
FIG. 1A is a schematic drawing of a rotor with a periodic magnet array.
Figure 1B:
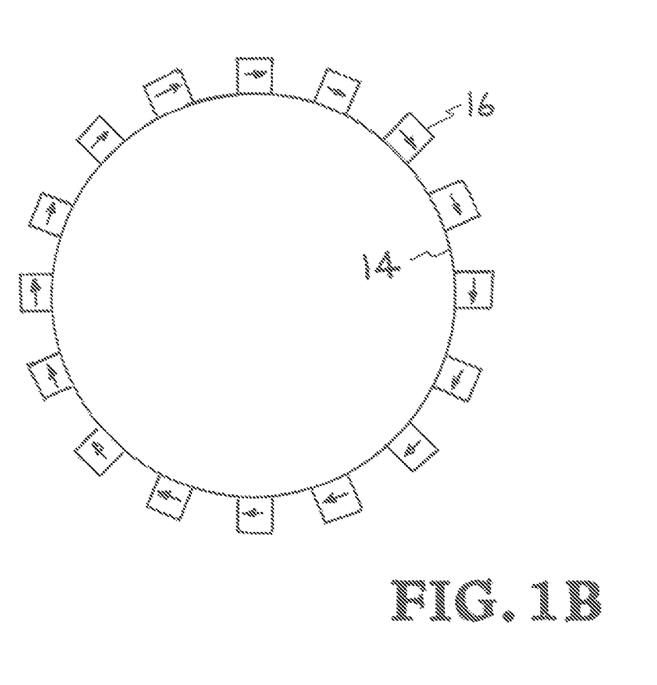
FIG. 1B is a schematic drawing of a stator with a periodic magnet array.

The invention can stabilize radially unstable., axially unstable, or tilt-unstable modes of a rotating object (such as an energy-storage flywheel rotor). A schematic drawing of an exemplary rotor 10 of the new stabilizer, one designed to stabilize radial or tilt instabilities, is shown in FIG. 1A. The figure shows an end view of the rotor periodic magnet array, made up of long rectangular bars 12 of permanent magnet material spaced apart from each other and extending along the longitudinal axis of the rotor (info the plane of the page). FIG. 1B shows the matching stator 14, which includes a matching array of permanent magnet bars 16. In this embodiment, the stator 14 is located within and concentric with the rotor 10.

The polarization of the rotor and stator bars need to be such as to result in a repulsive force between them. There are two possible polarization choices that could be made.

The first possibility is for the bars to be polarized in the radial direction, but opposite in direction for the stator and rotor bars. This choice is the one most often used in fabricating an attracting or repelling annular levitating magnet formed from a closely packed array of radially directed magnet bars. It is, however, not optimum or the present application for the following reason: When assembled into a periodic array with gaps between the bars, the Amperian currents in the bars will flow in opposite directions on the opposing faces of adjacent bars. Therefore, as the rotor bars rotate they will be exposed to Amperian currents that oscillate in direction, thus vitiating the time-averaged repelling force between the rotor and stator bars.

The second choice, one that avoids the problem noted above, is to orient the bars on the rotor and stator so that their polarizations are azimuthai In direction, and In the same direction for both the rotor and the stator magnets. In this case the Amperian currents in the bars flow axially, in one direction on the outer surface of each rotor and stator bar, and in the opposite direction on the Inner surface of each bar.

This means that the direction of the Amperian current on the inner surface of the rotor bar array is opposite to that on the facing, outer, surface of the stator bars. Oppositely directed currents result in a repulsive force between the bars.

Figure 2:
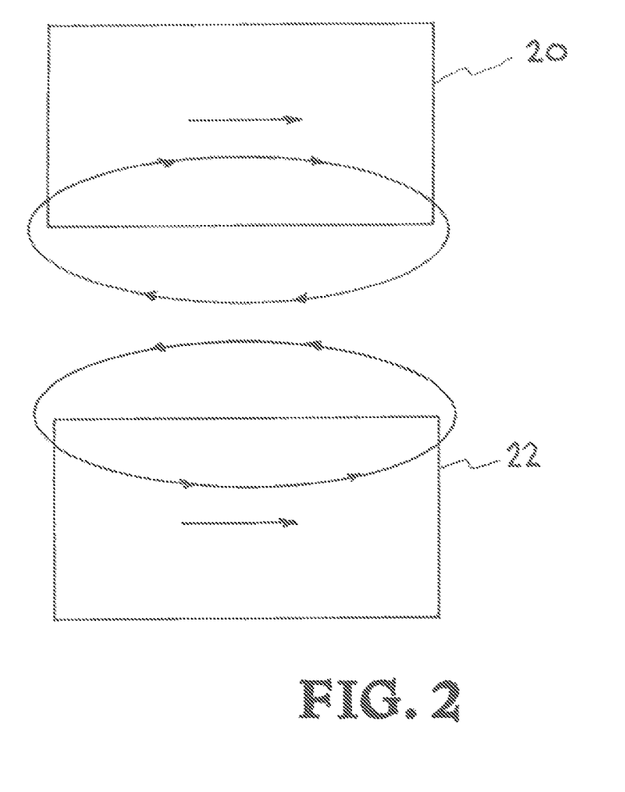
FIG. 2 is a schematic representation of a rotor bar and a facing stator bar showing the magnetic field lines around the bars.

With this bar orientation, the magnetic held between the rotor and stator arrays is azimuthally directed, in the same direction, at the mid plane between the bars. In agreement with the above qualitative argument, the force generated between the rotor and stator, as determined from the Maxwell Stress Tensor, is strongly repulsive on average as the rotor rotates. FIG. 2 is a schematic representation of a rotor bar 20 and a facing stator bar 22 showing the magnetic field lines around the bars. Rotor bar 20 is similar to rotor bar 12 of FIG. 1A. Stator bar 22 is similar to stator bar 1.6 of FIG. 1B.

The bars on the stator are typically greater in length from those on the rotor (or vice-versa). The stator and rotor magnet arrays are vertically co-centered with respect to each other (equal overlap at top and bottom) to insure that the repelling magnetic forces between the stator and rotor bars are independent of small axial displacements. When the rotor is at rest, this configuration would be unstable against tilt displacements, in that the magnet arrays on the rotor would tend to rotate so that their magnet bars faced the gap regions, following which motion., in agreement with Earnshaw's Theorem, the rotor would be unstable to tilting displacements. Thus this stabilizer, as with other ones of our stabilizer concepts (e.g., U.S. Pat. No. 5,847,480), will require a retracting mechanical "touchdown" bearing to suppress the tilt instability when, the rotor is stationary.

The key to the operation of this new stabilizer resides in the fact that when the frequency of variation of the repelling forces of the periodic magnet array is large (typically at least an order of magnitude greater) compared to the reciprocal of the growth time of the unstable motion, the rotating system will feel only the time-averaged value of the force. Since the time-averaged value of the force is guaranteed to be radially repelling by the choice of the geometry of the periodic magnet array, the Earnshaw-related unstable tilt motion that would occur at zero rotational speed is suppressed when the system is rotating at operating speeds.

In designing stabilizers using the concept of time-averaging the magnetic fields from a rotating periodic array of permanent magnets, it is important to reduce and even minimize the eddy-current losses that would arise in the magnets because of their exposure to time-varying magnetic fields. In our designs, we have visualized two viable solutions to this problem.

The first solution is to employ ceramic permanent magnets ($B_r$=0.39 Tesla), resistivity=106 ohm-meters). Eddy losses in these magnets would be totally negligible.

The second solution would be to employ bonded SmCo or bonded NdFeB magnets (Br of order 0.6 Tesla; resistivity of order 1 ohm-meter). By segmenting the magnet bars into many small-diameter square bars and then bonding these bars together with an insulating layer of glue, the eddy current losses can he made to be very small.

Results of Computer Simulation of the Stabiliser

Figure 3:
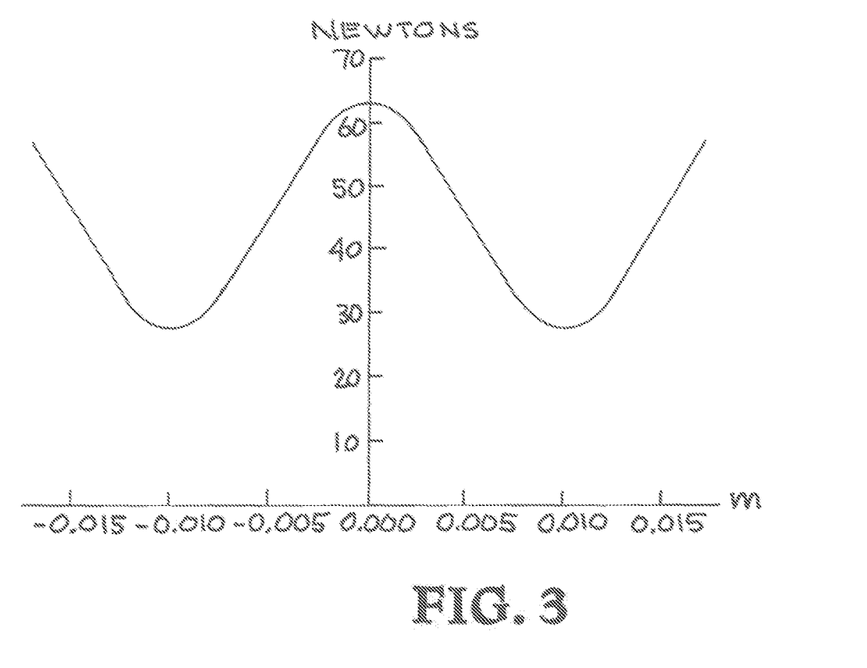
FIG. 3 is a plot of the azimuthal variation of the magnetic field between the rotor and stator magnet arrays when the bars are positioned to be directly opposite to each other.

A computer program has been written that models the performance of the stabilizer for typical systems. An example of the results of a calculation was performed using the following parameters:

$B_r$=0.39 Tesla
Inner radios of rotor=0.15 m.
Length of magnet bars=0.3 m.
Azimuthal width of magnet bars–0.01 m.
Spacing between adjacent bars=0.01 m.
Radial, depth of magnet bars=0.02 m.
Number of bars in a semi-circle of the array=24

FIG. 3 is a plot of the azimuthal variation of the magnetic field, between, the rotor and stator magnet arrays when the bars are positioned to be directly opposite to each other.

For die parameters given above the time and space-averaged radial stiffness of the stabilizer is 150 N/mm. From the above data the bit stiffness can also be calculated. The calculated value is 561 Newton-meters.

Considering the relatively small size of the rotor used in the above calculations, the calculated radial and tilt stiffness are large compared to typical values of negative stiffness calculated for the other elements of the passive bearing system[3].

Finally, it should be noted that our earlier passive bearing studies have shown that magnetic bearing systems designed to have azimuthal variations in their stiffness represent a very effective means of stabilizing the rotor system against so-called "whirl" instabilities. Even as small an azimuthal asymmetry of a few percent is sufficient in most cases. In the present case this asymmetry could be accomplished, for example, by a small azimuthal variation of the radius of either the stator or rotor magnet bar arrays with a max-min periodicity of a quarter of a full rotation.

Thus, a new form of stabilizer for passive magnetic bearing, based on the use of time-averaged periodic magnetic forces, has been described. The approach described represents an entirely different one from those employed in other LLNL-originated passive magnetic hearing stabilizers.

The case analyzed above is for a stabilizer that can stabilize radial and tilt instability. However, with changes in the geometry the same technique could be employed, to stabilize axial instabilities. For such a case the geometry of the rotor and stator magnet arrays would be planar.

All of the above cases have been concerned with the use of the new technique to stabilize radial, axial, or tilt instabilities associated with other elements of the entire passive hearing system. This new technique, however, could be used alone to stably levitate a rotating system. By using conical configurations of the rotor and stator magnet arrays, such as shown in FIG. 1 of U.S. patent application Ser. No. 14/512, 280 titled "Rotation-Speed-Independent Stabilizer for Passive Magnetic Bearing Systems", incorporated herein by reference, it is predicted that stable levitation could be achieved without the need for any other elements (except for a zero-speed touchdown bearing).

The new stabilizer geometry described above can also be employed in vertical axis rotating systems (such as EMB's of the types under study at LLNL) both as a stabilizer and a levitating bearing system. By assembling the rotor and stator magnet bar elements on a conical surface both radial stabilization and levitation of the rotating element can be achieved. In addition, the conical assembly can provide an automatic "lift-off action from a touchdown bearing that is operative only at zero speed up to lift off, as follows:

When stationary, the rotating magnet array will be unstable against rotation (to a position intermediate between adjacent positions where the bars face each other) accompanied by sagging vertically until it contacts the touchdown bearing. Now, when the system, is started up from zero speed it will automatically lift off as soon as the speed increases to the point where the time-averaging becomes effective.

Figure 4:
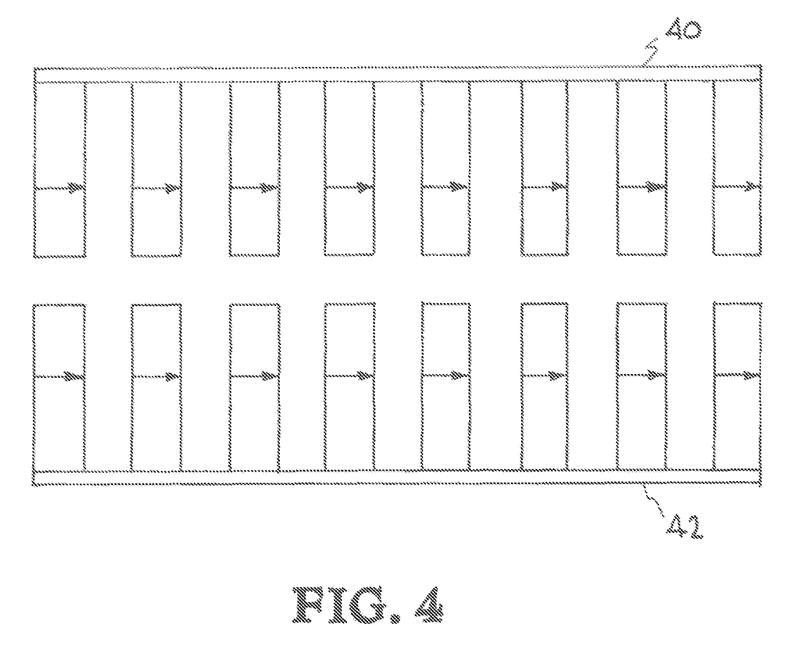
FIG. 4 shows a schematic representation of an improved linear version that uses a magnetic "shield" located on the back surface of the magnetic arrays.

Further study of the concept described in above has resulted in major improvement in the predicted performance of the stabilizer. A schematic representation of a linear improved version is shown in FIG. 4. The improvement consists in the addition of a magnetic "shield" 40, 42, located on the back surface of the magnetic arrays. This shield would take the form of a thin sheet of soft iron or other high-permeability material. The addition of this shield has the effect of eliminating the field-cancelling effect of the back edges of the magnet array that creates the periodic field of the stabilizer/bearing. Without the shield the time-averaged repelling force would be much smaller.

Figure 5:
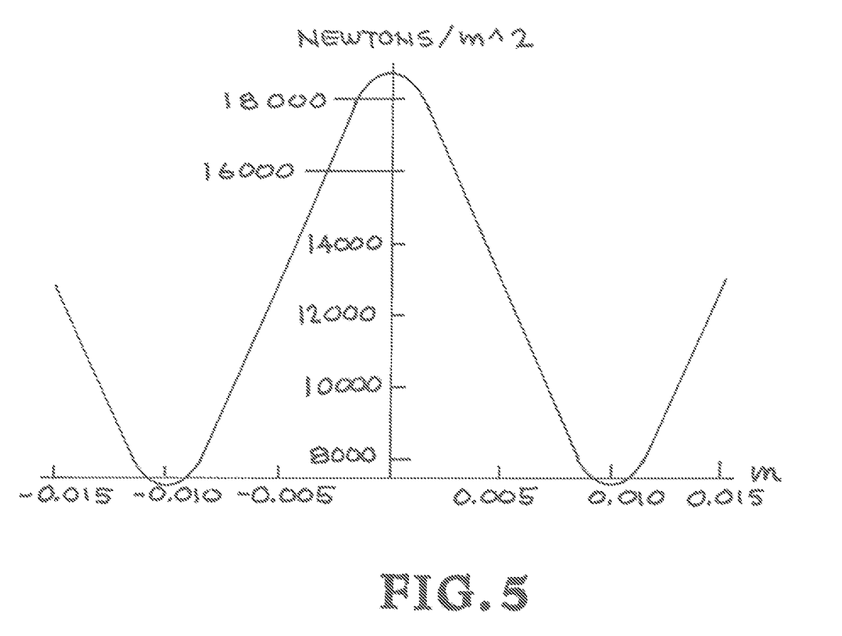
FIG. 5 is a plot of the repelling force as a function of rotor movement for a multi-bar linear stabilizer with ferromagnetic shield.
Figure 6:
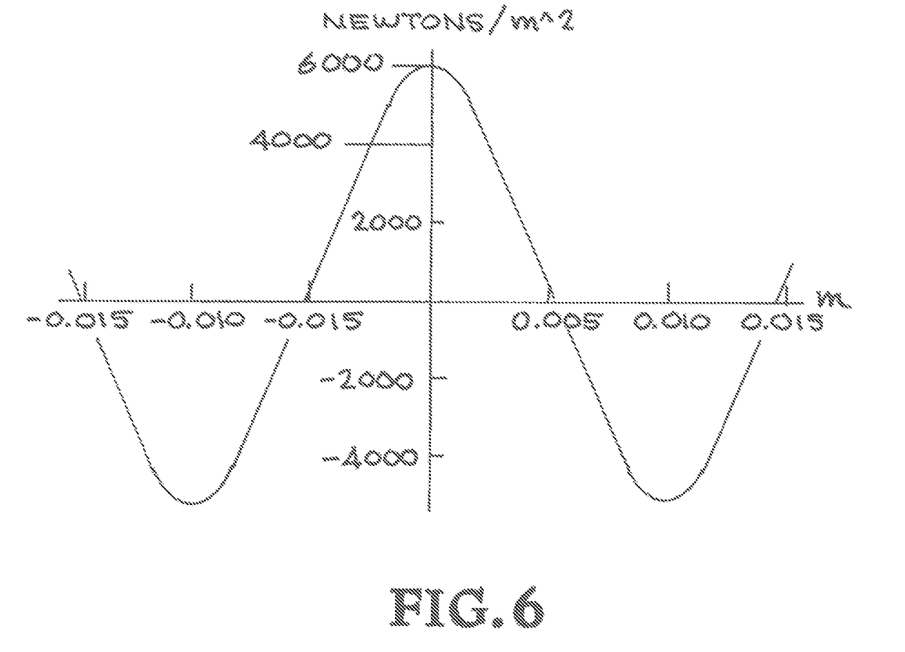
FIG. 6 is a plot of the repelling force as a function of rotor movement for a multi-bar linear stabilizer without ferromagnetic shield.

The results given below from the analysis of this (linear) form will represent a close approximation to the results that would be obtained in analyzing a circular stabilizer where the radial dimensions of the stabilizer are small compared to the radius of curvature of the bearing magnet array, FIG. 5 is a plot of the repelling force as a function of lateral movement of the rotor of FIG. 4, together with a listing of the repelling force in units of Newtons per square meter of bearing surface. The plot of FIG. 5 shows the repelling force as a function of rotor movement for a multi-bar linear stabilizer with a ferromagnetic shield. These results are to be compared to those depicted in FIG. 6, obtained with a similar magnet array to that depicted in FIG. 4, but with the ferromagnetic sheets removed. Thus, FIG. 6 is a plot of the repelling force as a function of rotor movement for a multi-bar linear stabilizer without the ferromagnetic shield The near-complete reduction in repelling force and stiffness is apparent from the data listed.

The calculations presented here were performed by making the ansatz that the presence of high-permeability ferromagnetic shields will insure that the component of the magnetic field that is tangent to the surface of the shield is forced to be zero over the entire inner and outer surface of the shield. The result of the cancellation of this field component would then insure the existence of the shielding effect that was assumed to be operative in performing the calculations. There exist finite-element codes that could be used to check the assumption made here and this could lie done to provide an independent check of the calculations presented here.

Average force=461.0 N/m²

As can be seen by comparing the calculated results shown above for the force with and without the ferromagnetic shield, in this example the average force without the shield approaches zero. The use of the shield is therefore seen to be essential for operation of the periodic field stabilizer.

A possible concern about, the use of ferromagnetic shields is that the magnetic field from the rotor magnets might induce energy-dissipating eddy currents in the stator shield, and vice-versa. A calculation of the magnetic field from the rotor at the position of the stator shield is not only that that field is very small but also that it is very nearly constant in value, owing to the fact that variations are cancelled out due to the averaging effect that occurs at distances that are large compared to the length scale of the periodicity of the field. We therefore conclude that eddy current losses in the shields will be negligibly small.

Figure 7A:
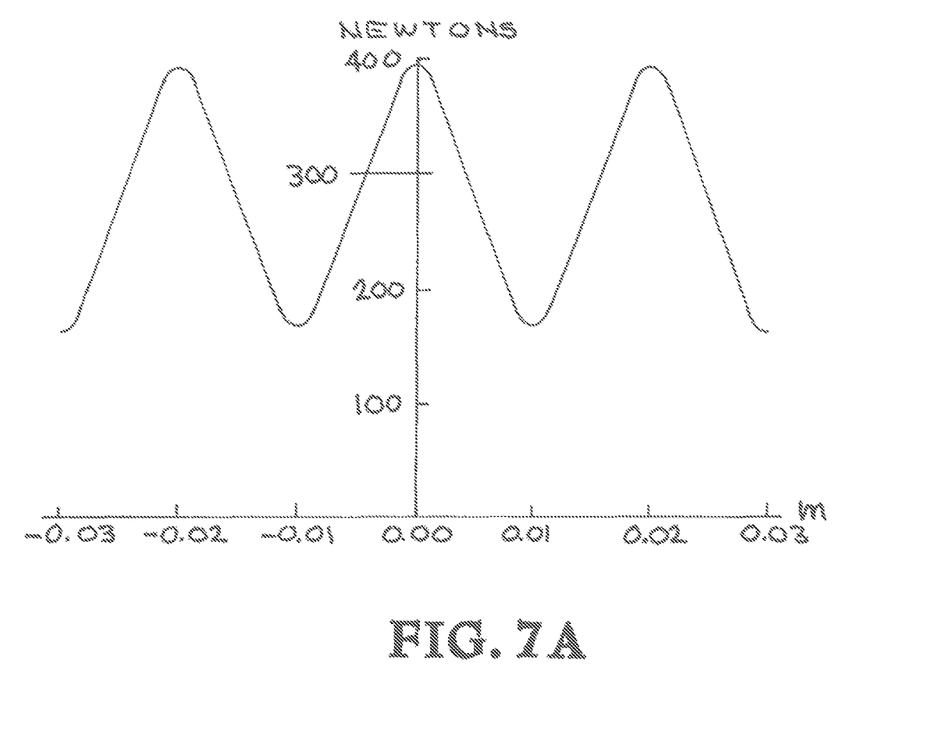
FIG. 7A shows variation of periodic stabilizer force with displacement for a magnet array 0.1 meters in vertical length.
Figure 7B:
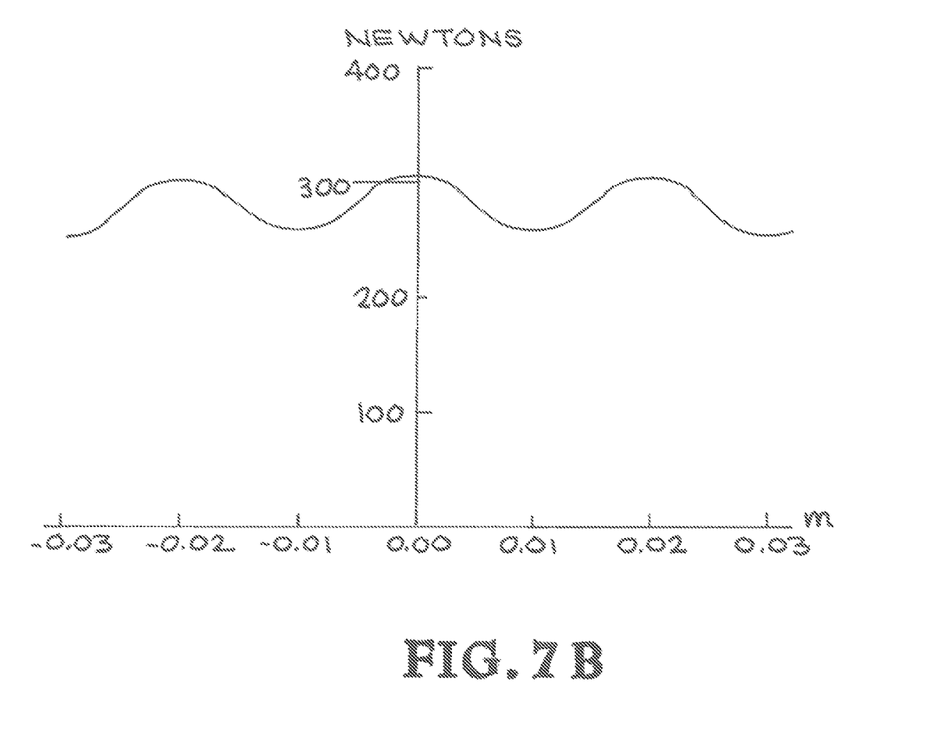
FIG. 7B shows variation of periodic stabilizer force with displacement for a 6- fold vertically subdivided stator magnet array of the same length.
Figure 7C:
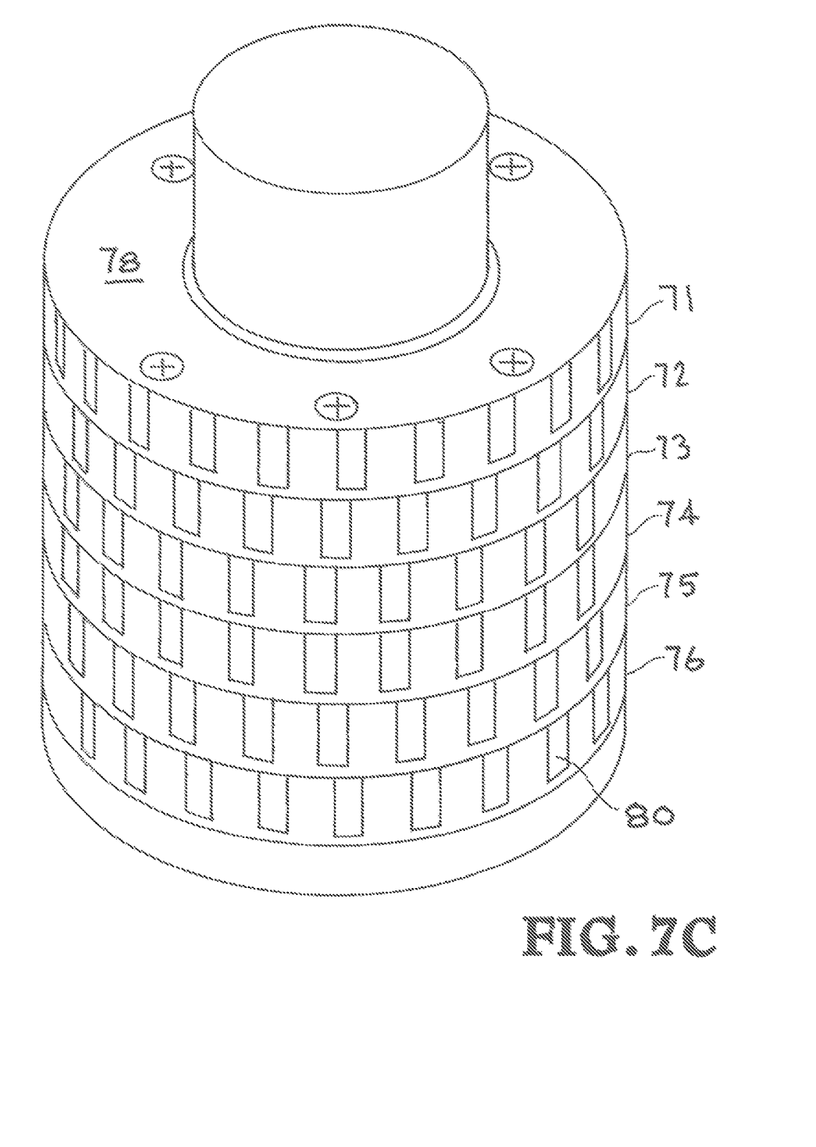
FIG. 7C shows an example of a6-fold vertically subdivided stator magnet array.

Further study of the present concept has resulted in an additional improvement in the predicted performance of the stabilizer. The improvement relates to a means to substantially reduce the amplitude of the periodic force pulses that would occur in the use of this new type of stabilizer in the form It has been described The improvement consists of modifying the rotor (or stator) magnet assembly by separating the assembly vertically into several sub-assemblies in which each of the magnet arrays is shifted azimuthally with respect to the other arrays. In this way the force pulses overlap and fill in the low spots on the force curve. The improvement is evident in the plots of FIGS. 7A and 7B. The FIG. 7A plot represents the force pulses that occur when there is no subdivision, and the FIG. 7B plot shows the case of six subdivisions of the rotor (or stator). The reduction in the amplitude of the force variation is evident in FIG. 7B. An example of a 6-fold vertically subdivided stator magnet array is shown in FIG. 7C which shows the case of six subdivisions (71-76) of a stator 78. In this embodiment, a rotor such as the one shown in FIG. 1 would be located on around the outside of stator 78. Each magnet array is comprised of individual magnets 80 azimuthally polarized in the same direction as ail the other magnets, as in the other embodiments described above. The magnets located on the rotor are aligned to be parallel with the longitudinal axis of the rotor, i.e., these magnets are not shifted azimuthally.

More specifically, FIG. 7A shows the variation of periodic stabilizer force with displacement for a magnet array 0.1 meters in vertical length. FIG. 7B shows a 6-fold vertically subdivided stator magnet array of the same length as FIG. 7A. For the non-subdivided array the ratio of maximum to minimum force is 2.36. For the subdivided array it is only 1.17. For the subdivided array the calculated average repelling force per unit area is 14154 Newtons/m², essentially the same as that for the non-subdivided array for which the calculated value is 1.4162 Newtons/m².

Figure 7D:
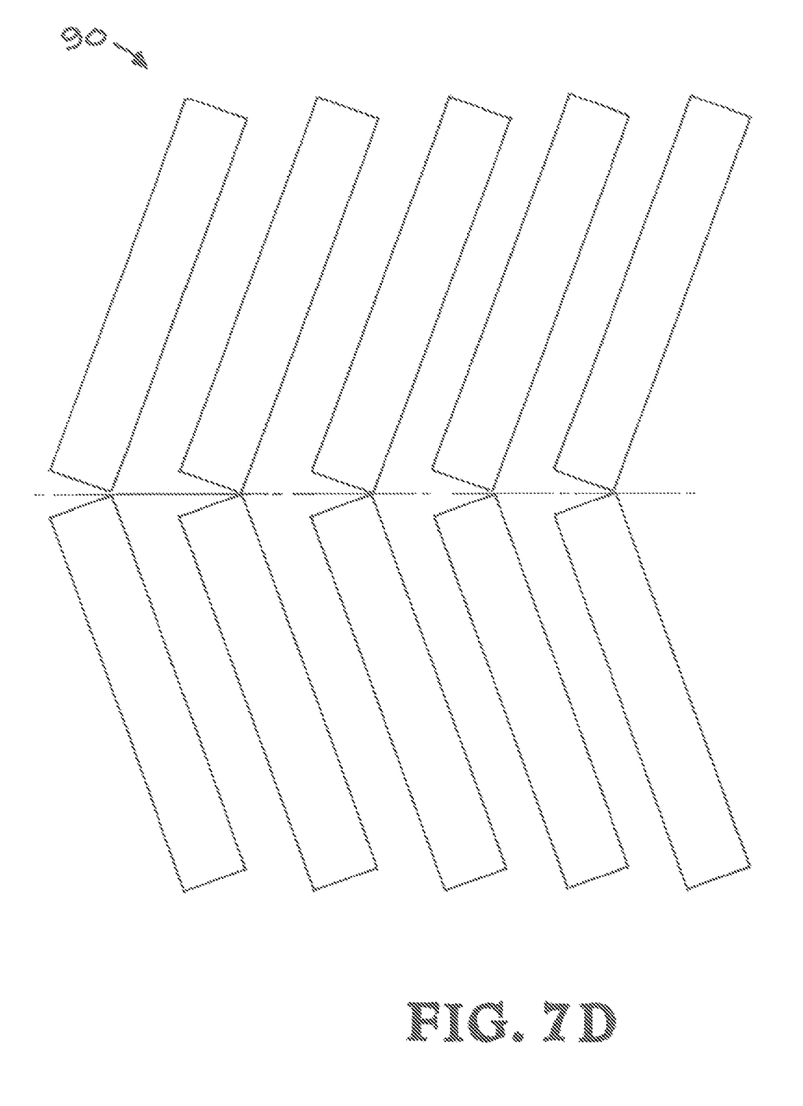
FIG. 7D shows an embodiment of a tilted magnet configuration.

An alternative method for producing the force-smoothing effect of subdividing the stator or rotor magnet arrays and displacement of them in azimuth with respect to adjacent arrays is the following one: If the magnet bars of the upper and lower halves of one of the arrays are tilted uniformly from the vertical position so that their upper and lower ends are displaced in azimuth by a single cell length, then the smoothing will be made to be nearly complete. By dividing the tilted arrays vertically info two sections one can avoid creating any periodic tilting moments that would otherwise occur in the absence of that subdivision. FIG. 7D shows an embodiment of such a tilted magnet configuration 90 of bars that are tilted with respect to the axis of rotation (longitudinal axis).

Thus, improved designs of the periodic stabilizer of present invention have been described that reduce the fluctuations in repelling force of such a stabilizer. These modified systems can also be employed, as a stable levitating passive magnetic bearing.

References (incorporated herein by reference):

[1] S. Earnshaw, "On the Nature of the Molecular Forces which regulate the Constitution of the Luminiferous Ether," Trans. of the Cambridge Phil. Soc., VII. Part I, p. 97 (1839)

[2] R. F. Post, "Magnetohydrodynamic Stabilization of Axisymreetric Mirror Systems using pulsed ECRH," Fusion Science and Technology, 57, 335 (2010)

[3] Kevin D. Bachovchin, James F. Hobnrg, and Richard F. Post. "Stable Levitation of a Passive Magnetic Bearing," IEEE Trans on Magnetics, 49,609 (2013)

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the Invention is to be defined by the following claims.

I claim:

1. An apparatus, comprising:
a cylndrical rotor centered on a longitudinal axis;
a plurality of permanent magnet first bars affixed to a surface of said rotor, wherein each bar of said first bars is evenly spaced, wherein said first bars are all azimuthally polarized in the same direction;
a cylindrical stator centered on said longitudinal axis; and
a plurality of permanent magnet second bars affixed to a surface of said stator such that said first bars and said second bars are facing each other, wherein said second bars are azimuthally polarized in the same direction as said first bars.

2. The apparatus of claim 1, wherein said, cylindrical stator is hollow, wherein apparatus comprises a configuration selected from the group consisting of (i) wherein said surface of said stator is the inner surface of said stator, wherein said rotor is located within the hollow portion of said stator, wherein said surface of said rotor is the surface facing said surface of said stator and (ii) wherein said surface of said rotor is the inner surface of said rotor, wherein said stator is located within the hollow portion of said rotor, wherein said surface of said stator is the surface facing said surface of said rotor.

3. The apparatus of claim 1, wherein said apparatus comprises a configuration, selected from the group consisting of (i) wherein said first plurality of permanent magnet bars is longer in the direction of said longitudinal axis than said second plurality of permanent magnet bars, wherein said first plurality of permanent magnet bars evenly overlap said second plurality of permanent magnet bars, wherein said first bars and said second bars are vertically co-centered with respect to each other, having about equal overlap at their respective tops and bottoms, to insure that the repelling magnetic forces between said first bars and said second bars are independent of small axial displacements and (ii) wherein said first plurality of permanent magnet bars is shorter in the direction of said longitudinal axis than said second plurality of permanent magnet bars, wherein said second plurality of permanent magnet bars evenly overlap said first plurality of-permanent magnet bars, wherein said first bars and said second bars are vertically co-centered with respect to each other, having about equal overlap at their respective tops and bottoms, to insure that the repelling magnetic forces between said first bars and said second bars are independent of small axial displacements.

4. The apparatus of claim 3, further comprising a retracting mechanical touchdown bearing to suppress the tilt instability when the rotor is stationary.

5. The apparatus of claim 1, wherein the length of each bar of said first bars is parallel to said axis and wherein the length of each bar of said second bars is parallel to said axis.

6. The apparatus of claim 1, wherein, upon, rotation of said rotor above a critical speed, the frequency of variation of the repelling forces between said first bars and said second bars is greater than the reciprocal of the growth time of the unstable motion such that the rotating system will respond to the time-averaged value of the force.

7. The apparatus of claim 1, further comprising means for reducing the eddy-current loses that arise in the magnets because of their exposure to time-varying magnetic fields, wherein said means for reducing the eddy current loses is selected from the group consisting of ceramic permanent magnets and bonded SmCo or bonded NdFeB magnets and segmenting the magnet bars into many small-diameter square bars and then bonding these bars together with an insulating layer of glue.

8. The apparatus of claim 1, further comprising an azimuthal asymmetry of the radius of either the stator or rotor magnet bar arrays with a max-min periodicity of a quarter of a full rotation, wherein said azimuthal asymmetry is for stabilizing the rotor system, against so-called "whirl" instabilities.

9. The apparatus of claim 1, further comprising means for diverting some of the azimuthal flux on the back side of at least one of said, first bars or said second bars to augment the azimuthal flux on the active face of the stabilizer, wherein said means for diverting is selected from the group consisting of (i) the addition of smaller thickness bars, azimuthally polarized in the reverse direction, and located in the gap regions between the full-height bars of the stator array and (ii) the addition of smaller thickness bars, azimuthally polarized In the reverse direction, and located in the gap regions between the full-height bars of the rotor array.

10. The apparatus of claim 1, wherein said rotor and stator magnet bar elements are on a conical surface configured to provide both radial stabilization and levitation of the rotating element.

11. The apparatus of claim 1, further comprising the addition, of a magnetic "shield" located on the back surface of the magnetic arrays, wherein said shield is for eliminating the field-cancelling effect of the back edges of the magnet array that creates the periodic field of the stabilizer/bearing.

12. The apparatus of claim 11, wherein said shield would take the form of a thin sheet of soft iron or other high-permeability material.

13. The apparatus of claim 1, further comprising means for reducing the amplitude of the periodic force pulses, wherein said means for reducing is selected from the group consisting of (i) a separation of the assembly vertically into several sub-assemblies in which each of the magnet arrays is shifted azimuthally with respect to the other arrays such that the force pulses overlap and fill in the low spots on the force curve and (it) a uniform tilt from the vertical position of the magnet bars of the upper and lower halves of one of the arrays so that their upper and lower ends are displaced in azimuth by a single cell length.

14. The apparatus of claim 13, wherein the tilted arrays are divided vertically into two sections to avoid creating a periodic tilting moment that would otherwise occur in the absence of that subdivision.

15. The apparatus of claim 1, wherein said first bars and said second bars are parallel to each other.

16. A method, comprising; providing the apparatus of claim 1; and
rotating said rotor above a critical speed wherein the frequency of variation of the repelling forces between said first bars and said second bars is greater than the reciprocal of the growth time of the unstable motion such that the rotating system will respond to the time-averaged value of the force.

17. The method of claim 16, further comprising reducing the eddy-current loses that arise in the magnets because of their exposure to time-varying magnetic fields, wherein said eddy current loses are reduced by a configuration selected from the group consisting of (i) ceramic permanent magnets and (ii) bonded SmCo magnets or bonded NdFeB magnets and segmenting said bonded SmCo magnets or bonded NdFeB magnets into many small-diameter square bars and then bonding these bars together with an insulating layer of glue.

18. The method of claim 16, further comprising providing an azimuthal asymmetry of the radius of either the stator or rotor magnet bar arrays with a max-min periodicity of a quarter of a full rotation, wherein said, azimuthal asymmetry is for stabilizing the rotor system against so-called "whirl" instabilities.

19. The method of claim. 16, further comprising utilizing a diverting means for diverting some of the azimuthal flux on the back side of at least one of said first bars or said second bars to augment the azimuthal flux on the active face of the stabilizer, wherein said diverting means is selected from the group consisting of (i) the addition of smaller thickness bars, azimuthally polarized in the reverse direction, and located in the gap regions between the full-height bars of the stator array and (ii) the addition of smaller thickness bars, azimuthally polarized in the reverse direction, and located in the gap regions between the full-height bars of the rotor array.

20. The method of claim 16, further comprising configuring said rotor and stator magnet bar elements are on a conical surface configured to provide both radial stabilization and levitation of the rotating element.

21. The method of claim 16, further comprising utilizing a magnetic "shield" located on the back surface of the magnetic arrays, wherein said shield is for eliminating the field-cancelling effect of the back edges of the magnet array that creates the periodic field of the stabilizer/bearing.

22. The method of claim 16, further comprising reducing the amplitude of the periodic force pulses, wherein said amplitude is reduced with a amplitude reducing means selected from the group consisting of (i) a separation of the assembly vertically into several sub-assemblies in which each of the magnet arrays is shifted azimuthally with respect to the other arrays such that the force pulses overlap and fill in the low spots on the force curve and (ii) a uniform tilt from the vertical position of the magnet bars of the upper and lower halves of one of the arrays so that their upper and lower ends are displaced in azimuth by a single cell length.

23. The method of claim 22, further comprising preventing the creation of a periodic tilting moment by dividing said tilted arrays vertically into two sections.

* * * * *